United States Patent [19]

Azzola et al.

[11] Patent Number: 4,619,077

[45] Date of Patent: Oct. 28, 1986

[54] WEATHER STRIP FOR MOTOR VEHICLE BODIES AND AN EXTRUSION HEAD FOR MAKING THE STRIP

[75] Inventors: Roberto Azzola, Turin; Luciano Carrera, Cirié, both of Italy

[73] Assignee: S.A.I.A.G. S.p.A., Turin, Italy

[21] Appl. No.: 568,565

[22] Filed: Jan. 6, 1984

[30] Foreign Application Priority Data

Jan. 6, 1983 [IT] Italy .............................. 67008 A/83

[51] Int. Cl.$^4$ .............................................. E06B 7/16
[52] U.S. Cl. ...................................... 49/497; 49/491; 49/498
[58] Field of Search ................... 49/490, 491, 497, 498

[56] References Cited

U.S. PATENT DOCUMENTS

| | | | |
|---|---|---|---|
| 2,963,754 | 12/1960 | Herman | 49/497 |
| 3,117,352 | 1/1964 | Keahard et al. | 49/497 X |
| 3,159,886 | 12/1964 | Lynch | 49/498 X |
| 4,308,302 | 12/1981 | Etter et al. | 49/498 X |

Primary Examiner—Kenneth Downey
Attorney, Agent, or Firm—Sughrue, Mion, Zinn, Macpeak, and Seas

[57] ABSTRACT

The weather strip is intended for application to the edge of an opening or a closure element for the body of a motor vehicle, this edge having successive, substantially straight portions connected by corner portions with small radii of curvature. The strip includes an anchoring section to which a tubular sealing section also of elastomeric material is connected, this being co-extruded with the anchoring section. The tubular sealing section has first and second longitudinal portions intended for connection to corresponding substantially straight portions and to corresponding corner portions of the said edge, respectively. The wall of the tubular sealing section, in the second longitudinal portions, has a thickness which is greater than the thickness of the first longitudinal portions; the increase in thickness is achieved during extrusion of the weather strip.

The invention also relates to an extrusion head for making such a weather strip.

2 Claims, 9 Drawing Figures

WEATHER STRIP FOR MOTOR VEHICLE BODIES AND AN EXTRUSION HEAD FOR MAKING THE STRIP

The present invention relates to a weather strip for the edge of an opening or a closure element of the body of a motor vehicle, the edge having successive substantially straight portions connected by corner portions having small radii of curvature. More particularly, the invention concerns a weather strip of the type which comprises an anchoring section of elastomeric material to which is connected a tubular sealing section also of elastomeric material and co-extruded with the anchoring section.

Extruded weather strips of this type have until now been formed with a constant cross-section. In particular, in such known weather strips, the wall of the tubular sealing section has a constant thickness.

When such a weather strip is fitted to the edge, for example, of an opening which has successive substantially straight portions connected by corner portions having small radii of curvature, and particularly when the substantially straight portions are at a rather small angle to each other, the portion of the sealing section of the strip in correspondence with the corner portions around the edge of the opening tends to flatten and crease and also moves away from the edge of the opening itself. This results in a deterioration of the sealing effect of the tubular sealing section around the curves of the opening. Moreover, the aesthetic appearance of the sections of the strip in the corner portions is not very satisfactory.

In order to avoid these disadvantages, it is possible to use a weather strip of the aforesaid type having a tubular sealing section with a very large wall thickness so that this tubular section is more difficult to deform when it is bent to follow a corner portion of the edge of an opening or of a closure element (door). However, this solution is unsatisfactory in that it involves the use of a larger quantity of material and, particularly, involves an increase in the so-called closure load of the door associated with the opening, that is, an increase in the force which must be exerted on the door in order to close it.

Hence, the object of the present invention is to provide a weather strip of the type and for the use described above, which allows the said disadvantages of the weather strips according to the prior art to be overcome.

This object is achieved according to the invention by means of a weather strip of the type defined above, the main characteristic of which lies in the fact that it includes first and second longitudinal portions for connection to corresponding substantially straight portions and to corresponding corner portions, respectively, of the edge of the opening or of the closure element, the wall of the tubular sealing section in the said second longitudinal portions having a greater thickness than the thickness of the first longitudinal portions, the increase in thickness being achieved during extrusion of the weather strip.

Further characteristics and advantages of the weather strip according to the invention will appear from the detailed description of one embodiment, which follows.

The invention also relates to an extrusion head for extruding a weather strip of the said type. In particular, the invention relates to an extrusion head of the type comprising a body having an aperture, and a core disposed within the aperture and defining together with the aperture an annular passage for the extrusion of a tubular sealing section.

The main characteristic of the extrusion head according to the invention lies in the fact that it includes at least one shutter mounted adjacent the aperture for movement relative to the body and movable from a rest position in which it does not obstruct the aperture to a plurality of working positions in which it obstructs the aperture and causes a partial restriction of the annular passage.

Further characteristics and advantages of the sealing strip and of the extrusion head according to the invention will appear from the detailed description which follows, given with reference to the appended drawings provided purely by way of non-limiting example, in which.

Figure 1:
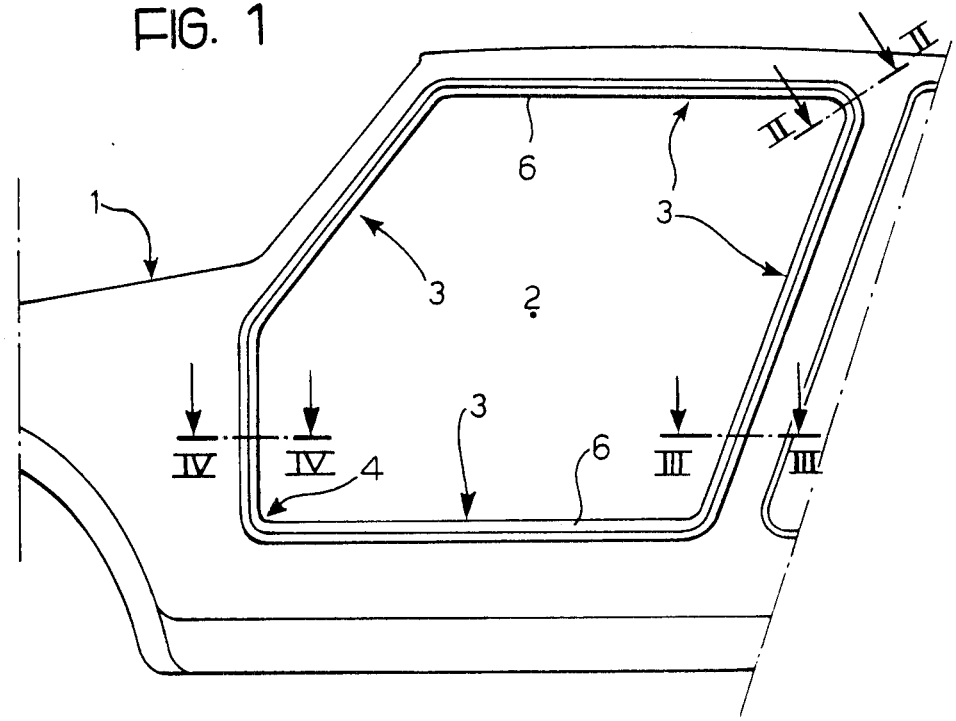
FIG. 1 is a partial side view of a motor vehicle body having an opening provided with a weather strip according to the invention.

With reference to FIG. 1, by 1 is generally indicated the body of a motor vehicle, for example a motor car, having an opening 2. In the example illustrated, the opening 2 is a front doorway of the motor vehicle.

The edge or periphery of the opening 2 has successive portions or sections 3 which are substantially straight and connected by corner portions 4 of small radii of curvature.

In the above and in what follows, the expression "substantially straight portions" means, in a broad sense, both portions which are actually straight and portions which are curved but have large radii of curvature.

Figure 2:
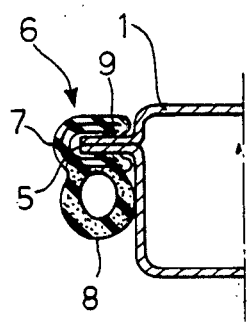
FIGS. 2 to 4 are sectional views taken on the lines II—II, III—III and IV—IV respectively of FIG. 1.
Figure 3:
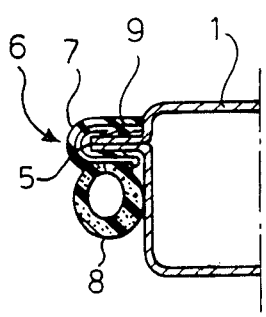
Figure 4:
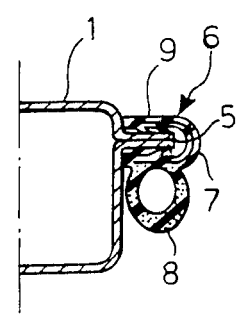

As shown in FIGS. 2 to 4, a weather strip, generally indicated 6, is applied to the edge 5 of the opening 2 and includes an anchoring channel section 7 constituted by a solid elastomeric material, to which is connected a tubular sealing section 8 of, for example, cellular elastomeric material co-extruded with the anchoring section 7.

Conveniently, in known manner, the anchoring section 7 includes an internal reinforcement 9 constituted, for example, by a metal strip incorporated during extrusion. The weather strip 6 may be formed by a conventional extrusion machine comprising an extrusion head of the type illustrated schematically in FIG. 5. In this Figure, an extrusion head 10 is shown with a duct 11 for feeding the cellular elastomeric material in the direction of the arrow F and a duct 12 for feeding the solid elastomeric material in the direction indicated by the arrow $F_2$.

The head 10 has a rear aperture 13 for the supply of the metal reinforcement 9 in the direction indicated by the arrow $F_3$.

Figure 5:
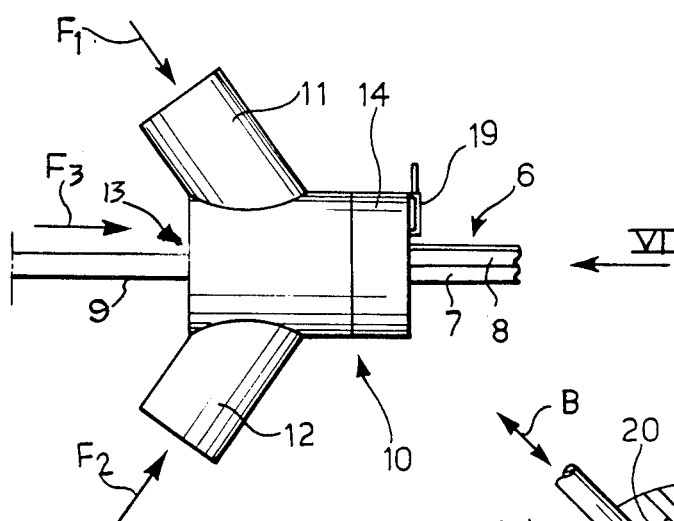
FIGS. 5 and 6 are a side view and a front view respectively of an extrusion head according to the invention.
Figure 6:
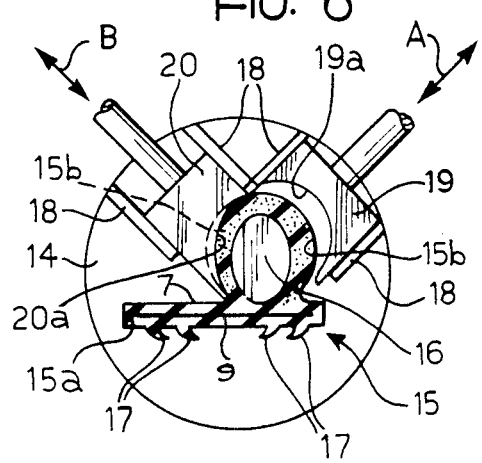

The extrusion die indicated at 14 in FIG. 5 is shown more clearly in FIG. 6. As is shown in this Figure, the extrusion die 14 has an aperture, generally indicated 15.

A first part 15a of the section of this aperture has a substantially rectangular shape with the upper larger side interrupted and connected to a further substantially circular part 15b of the section.

A core or central part 16 is located in the aperture 15 of the extrusion die so as to be spaced from the portion 15b of the wall of this aperture to define therewith an annular passage.

The lower larger side of the rectangular portion of the aperture 15 has a series of substantially V-shaped notches 17.

The aperture 15 and the core 16 define the extrusion orifice of the die 14.

As is seen from FIG. 6, there are two pairs of guides 18 on the front free face of the die 14, between which are movably mounted two shutter members 19, 20. The shutter members 19, 20 may be moved by conventional drive means, not illustrated, along the respective pairs of guides in respective directions, indicated by the arrows A and B respectively, which converge towards the core 16.

The side 19a and the side 20a, respectively, of the shutters 19 and 20 facing the core are arcuate with their concavites facing the core 16. The latter extends axially cut of the aperture 15 of the die to an extent at least equal to the thickness of the shutter members 19, 20.

In FIG. 6, the shutter member 19 is shown in a rest position in which it does not obstruct the extrusion orifice. The shutter member 20, however, is shown in a working position in which it partially occludes a portion of the annular passage defined between the core 16 and the wall 15b of the aperture 15, restricting the annular passage section.

Figure 7:
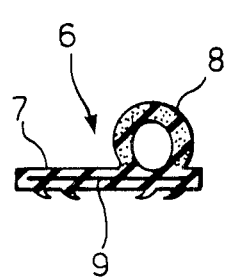
FIGS. 7 to 9 show three different types of cross-section of the weather strip according to the invention, which can be obtained by means of the extrusion head shown in FIGS. 5 and 6.

In operation, when both the shutter members 19, 20 are held in their rest positions, the form of the cross-section of the strip 6 is that shown in FIG. 7.

Figure 8:
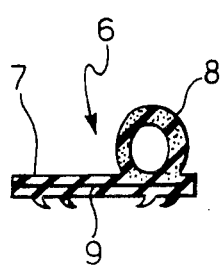

When, in operation, only one shutter, for example, the shutter 20, is moved towards the core 16, as is shown in FIG. 6, the form of the cross-section of the weather strip 6 is that shown in FIG. 8. When both the shutters 19, 20 are in their respective working positions, the weather strip 6 assumes a cross-section of the type shown in FIG. 9.

Thus, by controlling the movement of the shutter members 19, 20 in a predetermined manner, one can form a weather strip by continuous extrusion with a tubular sealing section having a wall thickness which is variable between a minimum value (FIG. 9) and a maximum value (FIG. 7).

The extrusion head 10 described above thus allows a weather strip 6 to be obtained for the opening 2 of the motor vehicle shown in FIG. 1, which has a tubular sealing section 8 with a wall thickness greater in the portions intended to be connected to the corner portions of the edge of the opening than in the portions of the weather strip intended to be connected to the substantially straight portions of the edge of the opening 2.

The greater thickness of the wall of the sealing section in the corner zone of the opening 2 makes this section less deformable in the corners and hence avoids both the aesthetic and the functional disadvantages (loss of sealing) of the prior art weather strips with sealing sections of constant thickness.

In the longitudinal portions of the weather strip connected to substantially straight portions of the edge of the opening 2, the thickness of the wall of the tubular sealing section 8 is reduced. Consequently, the closure load of the door (not illustrated) associated with the relevant opening of the motor vehicle is fairly small.

Generally, the access openings of the motor vehicle body are provided with movable closure elements (doors) connected to the body close to the edge of the opening by means of hinges.

Close to these hinges, the tubular sealing section of the weather strip applied to the access opening must have a minimum thickness, so as to be easily deformable during closure of the door to avoid so-called "springing" of the door. The portion of weather strip intended to be coupled to the portion of the edge of the opening adjacent these hinges may be formed by means of the extrusion head 10 with both the shutter members 19, 20 in their advanced working positions, whereby in this portion the thickness of the wall of the tubular profiled section 8 is at a minimum, as illustrated in FIG. 9.

Summarising what has been explained above, for an opening 2 of the body of a motor vehicle of the type shown in FIG. 1, it is possible to form a weather strip with three different thicknesses of the wall of the tubular sealing section. More particularly, in the portions 3 which are substantially straight, the wall of the tubular sealing section is only partially reduced, that is, it is of the type shown in FIG. 8 (before bending of the anchoring section 7) and in FIG. 3 (after assembly).

In the corner portions 4 with small radii of curvature in FIG. 1, the thickness of the wall of the profiled tubular sealing section 8 is at a maximum, that is, it is of the type shown in FIG. 7 and in FIG. 2.

Figure 9:
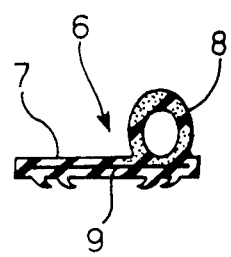

In the portion 3' of the weather strip intended to be applied to the opening 2 close to the hinges of the door, the thickness of the wall of the sealing section 8 is conveniently at a minimum, as shown in FIGS. 9 and 4.

Conveniently, in order to synchronise the operation of the shutter members 19, 20 with the advance of the weather strip 6 leaving the extrusion head 10, the process and apparatus forming the subject of Italian patent application No. 68449-A/82 filed on 10th December 1982 in the name of the same Applicant, may be used.

We claim:

1. Weather strip adapted for securement to the edge of an opening or the edge of a closure element closing the opening in the body of a motor vehicle wherein the edge is comprised of successive, substantially straight portions connected by corner portions having small radii of curvature, the weather strip including an anchoring section of elastomeric material to which a tubular sealing section also of elastomeric material is connected, and comprising first and second longitudinal portions for connection to the substantially straight portions and to the corner portions of the edge, respectively; the wall of the tubular sealing section having a greater thickness in the second longitudinal portions than the first longitudinal portions, the increase in thickness being achieved during extrusion of the weather strip.

2. Weather strip according to claim 1, particularly adapted for the edge of an opening or the edge of a closure element for the opening of a motor vehicle having the moveable closure element connected to the body close to said edge by a hinge wherein the longitudinal portion of the weather strip adapted to be fixed to the edge adjacent the hinge has a tubular sealing section with a wall thickness which is less than the thickness of the wall of the tubular sealing section of said first longitudinal portions of the weather strip, the reduction in thickness being achieved during extrusion of the weather strip.

* * * * *